United States Patent [19]

Borelli

[11] 3,958,251

[45] May 18, 1976

[54] ELECTROGRAPHIC PRINTING SYSTEM UTILIZING MULTIPLE OFFSET STYLI

[75] Inventor: Ronald F. Borelli, Edmond, Okla.

[73] Assignee: Honeywell Information Systems Inc., Waltham, Mass.

[22] Filed: Jan. 2, 1973

[21] Appl. No.: 320,420

[52] U.S. Cl. .......... 346/74 EE

[51] Int. Cl.$^2$ .......... G01D 15/06; G03G 13/04

[58] Field of Search .......... 346/74 S, 74 SB, 74 SC, 346/74 ES, 139 C, 74 EE

[56] References Cited

UNITED STATES PATENTS

| | | | |
|---|---|---|---|
| 3,611,419 | 10/1971 | Blumenthal | 346/74 ES |
| 3,624,661 | 11/1971 | Shebanow | 346/74 ES |
| 3,718,936 | 2/1973 | Rice | 346/74 ES |

OTHER PUBLICATIONS

*Xerography and Related Processes,* Dessauer & Clark, pp. 439 to 442, Focal Press, 1/69.

*Primary Examiner*—Bernard Konick
*Assistant Examiner*—Jay P. Lucas
*Attorney, Agent, or Firm*—Ronald T. Reiling; Nicholas Prasinos; William F. White

[57] ABSTRACT

An electrographic printer is provided with a multiple row electrode structure wherein the electrodes in each row are mutually spaced one from the other and the electrodes of successive rows are staggered with respect to one another. The electrodes are each characterized by being of a smaller dimension in the direction of movement of the print medium than in the transverse direction, and an electrode drive circuit operates to maintain the electrodes activated when the print medium is moved across it to produce a latent image on the print medium.

5 Claims, 5 Drawing Figures

ELECTROGRAPHIC PRINTING SYSTEM UTILIZING MULTIPLE OFFSET STYLI

BACKGROUND OF THE INVENTION

The present invention relates in general to reproducing images on a medium having a conductive base substrate and a dielectric layer, and more particular to an electrographic printing device for use in data processing.

Various processes and techniques of image reproduction are found in the prior art, which are concerned with the electrostatic transfer of a charge onto a print medium. In such electrographic printing systems, including the system herein disclosed, a latent image is formed on a dielectric medium by placing the medium in the field established between two electrodes. The two opposed electrodes have a high electrical potential difference supplied across them, thereby establishing the necessary field across the direction medium. The latent charge image formed on the medium is in the shape of the electrode surface that faces the dielectric surface of the medium.

There are various types of electrographic printing systems, one of which employs character shaped electrodes and wherein a print drum is rotated at high speed and selected electrodes are pulsed when the desired character is facing the dielectric surface, causing the formation of latent images on the medium at the area where the character electrode is located.

Another system employed in prior art devices is the pin type of system wherein various patterns such as alpha-numeric characters are reproduced by selecting predetermined electrodes, as the recording medium passes the electrodes.

A third type of system is disclosed in U.S. Pat. No. 3,624,661 entitled "Electrographic Printing Systems With Plural Staggered Electrode Rows" issued Nov. 30, 1971 to Shebanow and Borelli, and assigned to the assignee of the present invention. This system provides a multiple row electrode structure wherein successive rows are mutually spaced from each other, each row including mutually spaced electrodes with the electrodes of successive rows being positioned in a staggered manner, with respect to each other. A drive circuit is also disclosed in the aforementioned patent wherein a plurality of output lines coupled the matrix to the electrodes so as to selectively apply a high voltage to the electrodes to produce a latent image on a dielectric medium. The apparatus set forth in that patent, through the use of a dual row set of styli which when energized provides a means of printing high quality matrix characters, is found to be a distinct improvement over prior art electrographic printing apparatus and has achieved good results.

However, in the disclosure of the above-referred to patent, the print head consists of offset styli of equal cross-sectional area, as well as providing for equal spaces between adjacent styli and an equivalent spacing between rows. Printing is accomplished by electrically energizing the required styli necessary to form the shape of the desired character as the electrographic medium is transported over the print head. The conventional electrographic process is used to form the latent image (charged image) on the dielectric medium surface, which is later developed in a toning station.

Therefore, to form a completely solid character, the first row must be electrically energized first, and the second row energized only when the dots printed in the first row move in between the styli of row two. While the use of the substantially square styli at relatively large spacing has proved satisfactory, it has been found that by reducing the cross-sectional area of the styli, through a change in the mode of operation of the printing technique, faster printing will result and lower voltages can be used to generate a high quality of character printing.

The present invention therefore has as an object to provide a print head of the type described which is simple to manufacture and having styli of reduced capacitance thereby reducing the circuit loads for the styli circuit drivers.

Another object of the present invention is to reduce the possiblity of styli destruction from capacitance discharge by providing apparatus where less energy is stored between the styli.

A further object of the present invention is to reduce the styli cross-sectional area thereby lowering the voltage required on each stylus to establish an electrostatic field for printing and increasing the printing speed, while maintaining high print quality.

SUMMARY OF THE INVENTION

In the present invention print head means is provided wherein a plurality of styli are presented in a plurality of rows, the styli being spaced one from the other and staggered with respect to adjacent rows. The print medium is moved over the rows of styli, and the styli are characterized in that the dimension in the direction of the print medium is less than the dimension perpendicular to the print medium movement. A solid row of print is achieved by the aforementioned print head means by selectively energizing the styli required to form the matrix character and maintaining electrical energization of the styli during movement of the medium to deposit an electrostatic charge on the print medium through draggging of the energized electrode across the print medium, rather than through pulsing the styli, during the print operation.

Circuit means is provided to maintain energization of a print stylus during movement of the medium across that stylus until such time as printing is no longer needed at the said stylus position on that portion of the print medium being moved across the said stylus.

BRIEF DESCRIPTION OF THE DRAWING

The above cited objects of the invention as well as other objects, together with the features and advantages thereof, will become apparent from the following detailed description of a preferred embodiment taken in connection with the accompanying drawing, wherein:

FIG. 2*b* is a block diagram showing the drive circuitry associated with the structure of FIG. 2*a.

DESCRIPTION OF THE PREFERRED EMBODIMENT

Figure 1A:
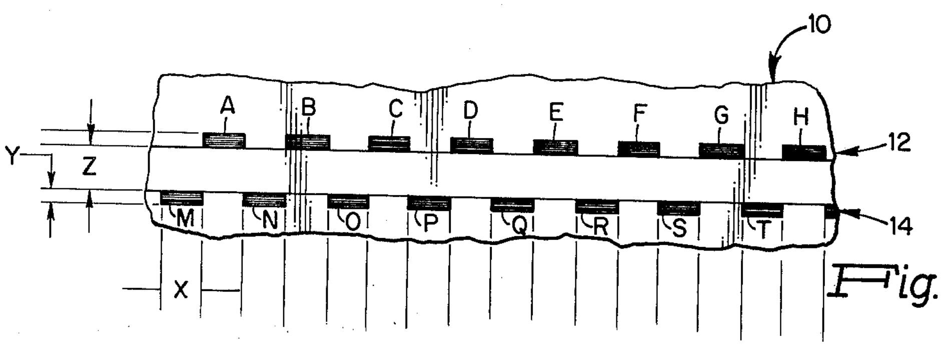
FIG. 1*a* is a fragmentary plan view of the electrode structure of the present invention showing the end surfaces of the electrodes over which the print medium passes.
Figure 1B:
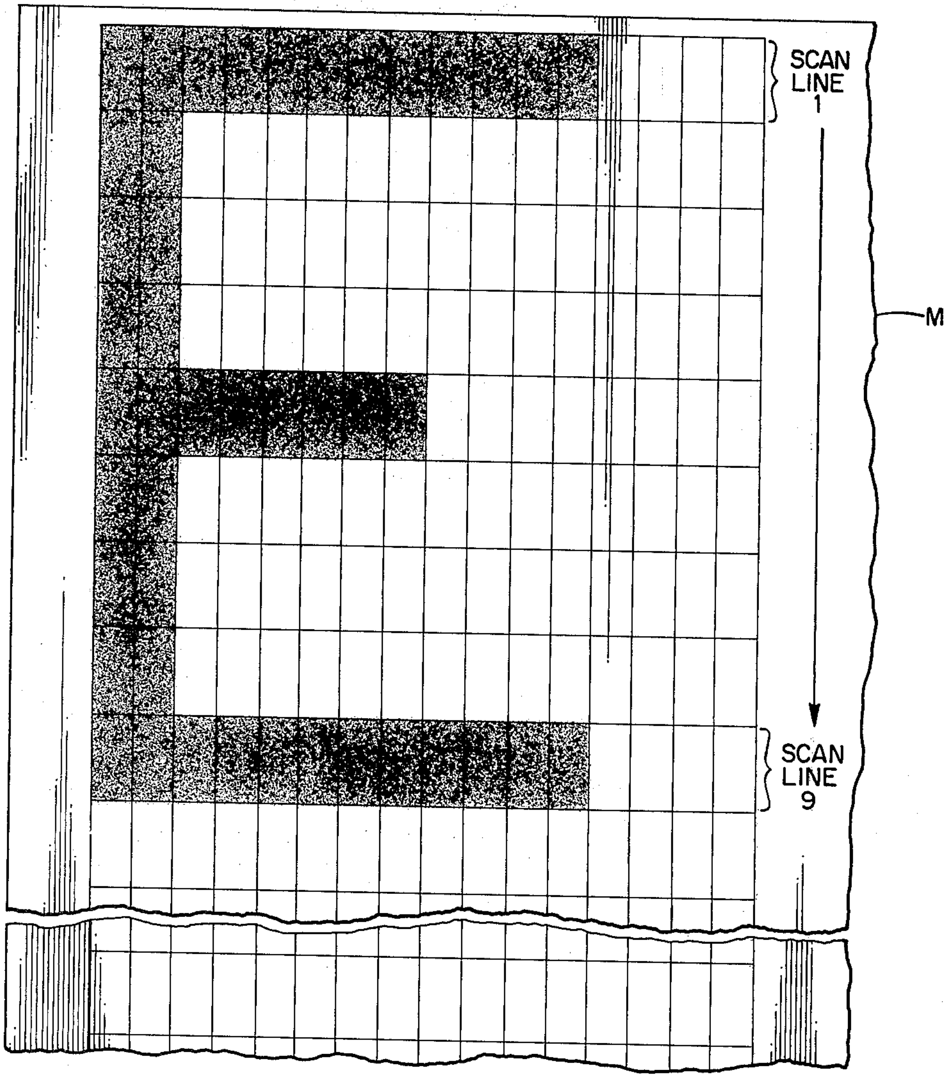
FIG. 1*b* is a fragmentary view showing a portion of the print surface of the print medium, wherein the latent charge pattern for the letter E has been deposited by the electrodes of FIG. 1*a;*
Figure 2A:
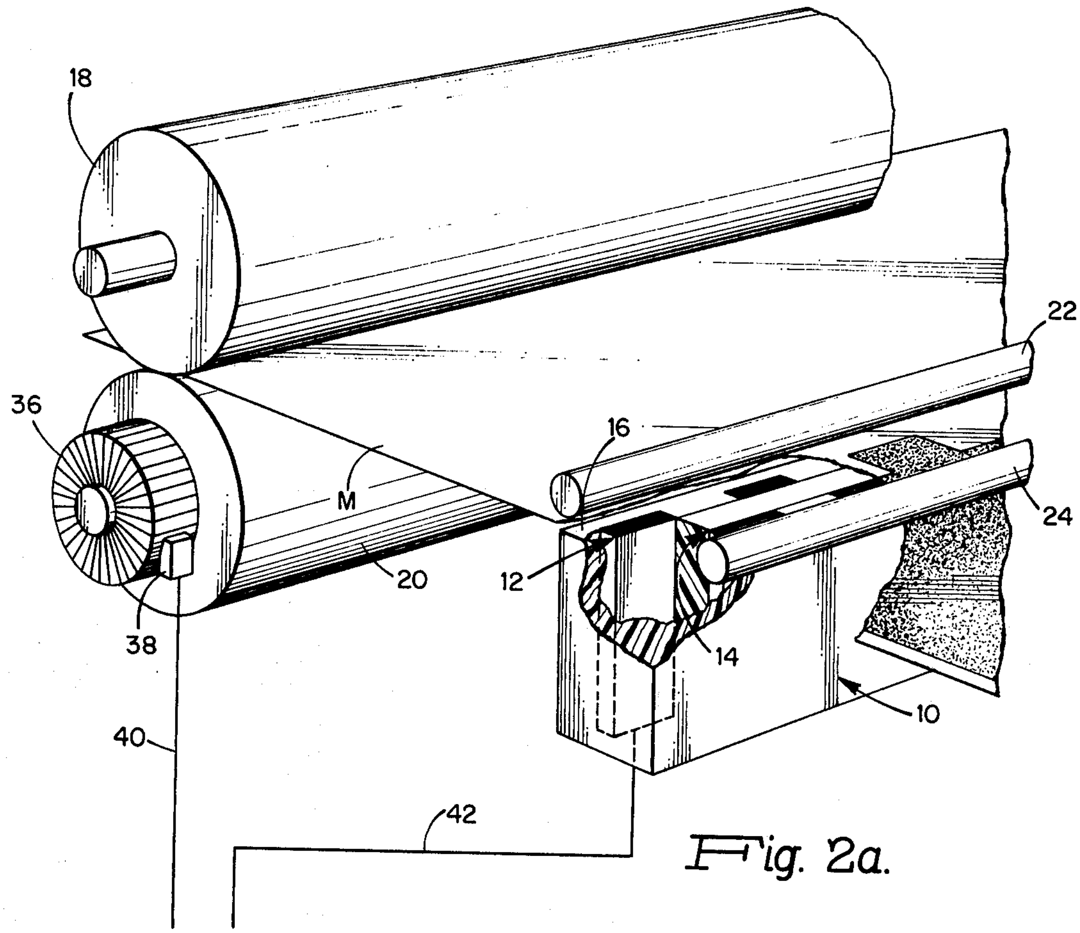
FIG. 2*a* is a perspective view, partially in section, showing a portion of the electrographic printing apparatus in accordance with the present invention.

Referring now to the drawing and in particular FIGS. 1*a* and 1*b* taken in conjunction with FIG. 2*a*, there are shown portions of an electrographic printing system comprising a print head 10 having a row 12 of styli, and a row 14 of styli mounted therein with the styli ends substantially flush with a surface 16 of the print head.

As best shown in FIG. 1*a*, the surface 16 of the print head 10, when viewed from the plane of the print medium M, presents the ends of the electrodes forming the styli in the rows 12 and 14 the electrode ends being designated A through H in row 12 and M through T in row 14. Each of the electrodes A through H and M through T is of a dimension Y in the direction of print medium movement and a dimension X transverse to the direction of print medium movement and the rows 12 and 14 are spaced a dimension Z, one from the other. The print head 10 may be fabricated by any means known in the art such as that shown and described in the aforementioned U.S. Pat. No. 3,624,661, wherein chemical etching is used.

In practice, the electrode ends are rectangular in shape with the dimension X being in the order of five mils, the dimension Y being in the order of 1 mil, and Z being determined by the time duration over which the styli are energized multiplied by the velocity at which the paper is travelling.

Figure 2B:
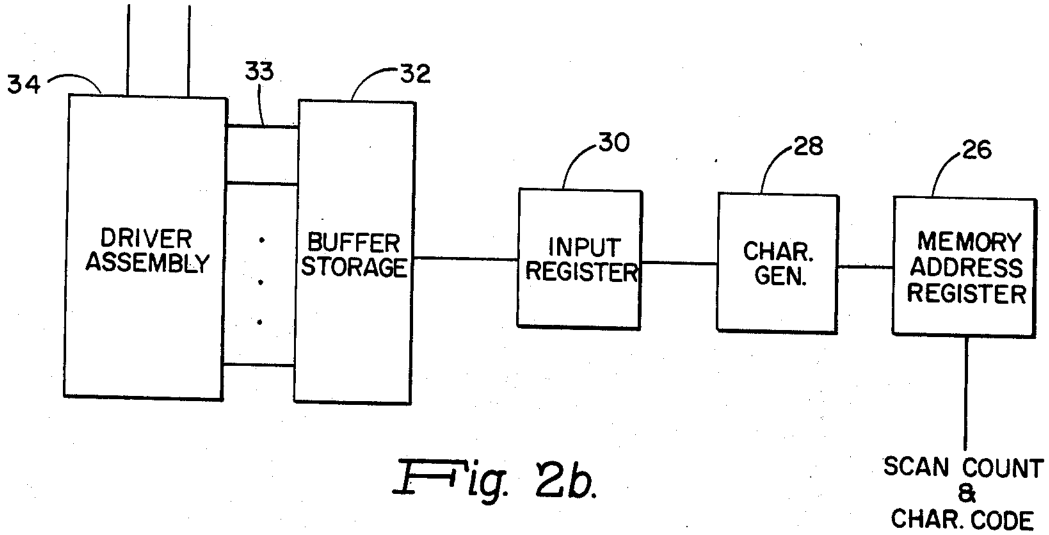

Referring now to FIGS. 2*a* and 2*b* it will be noted that the electrographic printer apparatus further includes a pair of rollers 18 and 20 which operate to move the print medium 11 across the print head 10. A second roller pair comprising the rollers 22 and 24 is disposed adjacent the print head surface 12 and in spaced relation therewith, and in one aspect serves to maintain the print medium M in contact with the surface 12 of the print head 10, during operation of the device. The rollers 22 and 24 serve a further function as electrodes in the printer circuit, which will be explained in greater detail hereinafter.

In FIG. 2*b* it will be observed that the electrode drive circuitry receives a scan count and character code information from the computer (not shown) which is transmitted to a memory address register 26 from which signals are transmitted to a configuration generator or character generator 28. Thus far, the circuitry is similar to that disclosed in the aforementioned U.S. Pat. No. 3,624,661 and further discussion of these devices is therefore not considered necessary for an explanation of the present invention.

From the character generator 28 signals indicating the absence or presence of printing developed by each scan line is transmitted to an input register 30 and stored in the buffer register 32. As in the aforementioned U.S. Pat. No. 3,624,661, the present character printing system contains 132 characters to be printed in the horizontal direction, or the direction transverse to the movement of the print medium. In the present device, a similar arrangement of a 16 × 25 cell matrix is also used to print each character, and therefore as in the previously disclosed device, a scan line contains 132 × 16 or 2,112 electrodes per scan line. From the buffer 32 therefore, there are 2,112 lines connected to the driver assembly 34, which will be explained in greater detail as the description proceeds.

Referring to the roller 20 shown in FIG. 2*a*, a code disc 36 is attached to the roller such that it rotates with the roller, and has a plurality of equally spaced code generating indicia formed thereon which operate to influence a pick-up 38, which sends a pulse to the drivers each time one of the indicia passes the pick-up. The code disc 36 and pick-up 38 may be of any optical or magnetic type which are well known in the art, the only requirement being that for each of the indicia on the disc 36 which passes the pick-up 38, a pulse is generated over a line 40 indicating that the paper moving through the rollers 20 and 18 has moved a predetermined increment. A line 40 connects each of the drivers in the assembly 34 with the various electrodes in the styli of row 12 and row 14, there being 2,112 electrodes and therefore 2,112 lines 42, one for each electrode.

Figure 3:
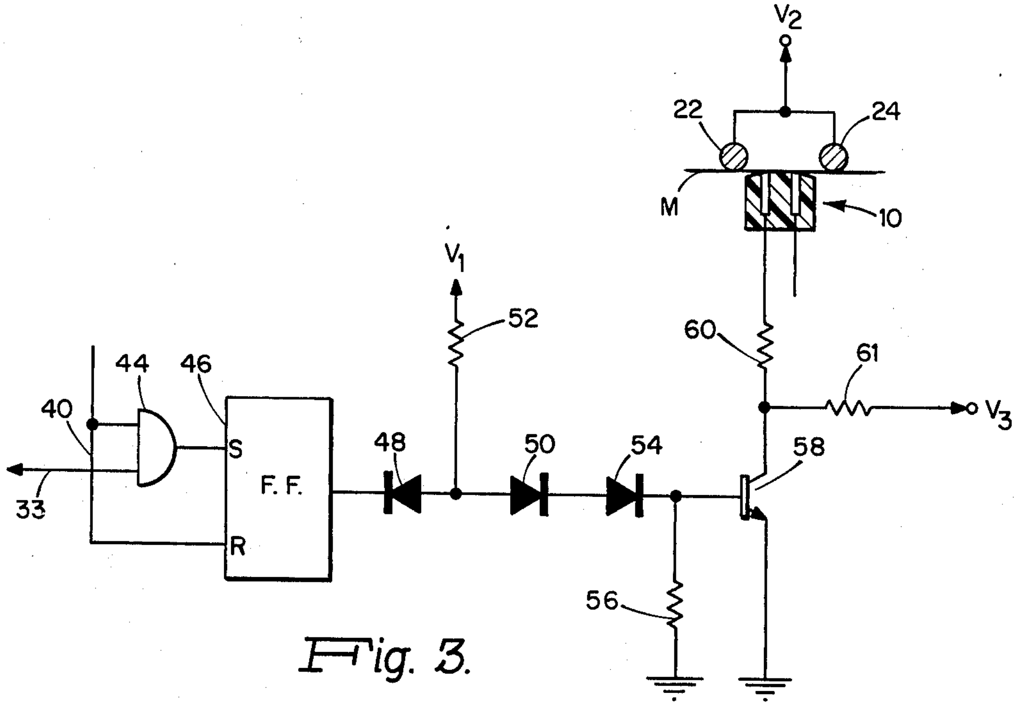
* and FIG. 3 is a circuit diagram showing details of a portion of the drive circuitry of FIG. 2*b*.

Referring now to FIG. 3, there is shown a portion of the driver structure found in the driver assembly 34. As alluded to above, there are 2,112 of the circuits shown in FIG. 3, one for each styli electrode. Each circuit contains an AND gate 44 having one input from the sensor 38 through the line 40, and a second input from one of the lines 33 connected to the buffer storage 32. The AND gate 44 is connected to one input of a flip-flop 46 which has a second input from the line 40. The output of the flip-flop 46 is fed to the cathode of a diode 48 which has its anode connected to the anode of a diode 50.

A resistor 52 is connected from a junction between the anodes of the diodes 48 and 50, to a power supply $+V_1$. The cathode of the diode 50 is connected to the anode of a diode 54 which is connected in common to ground through a resistor 56, and to the base of a transistor 58. The emitter of the transistor 58 is connected to ground and the collector of the transistor is connected at a common junction through a resistor 60 to a respective electrode in the head 10 and through a resistor 61 of greater value to a voltage source $V_3$. The voltage $V_2$ is in the order of 600 volts and voltage $V_3$ is in the order of 450 volts the resistor 60 having a value of 100K and resistor 61 a value of 4.7M. Thus, each of the electrodes forming the styli in the rows 12 and 14 are provided with a circuit as shown in FIG. 3 for providing electrostatic charge to the print medium M.

As in the prior referred to patent to Shebanow et al, the rollers 22 and 24 are each provided with a steady state voltage $V_2$ which completes the circuit for depositing the electrostatic charge on the medium M.

Referring now to the figures as described, the printing of the letter E as shown in FIG. 1*b*, would proceed in the following manner. The information relative to the character to be printed would be obtained from the computer or input device and a first scan would load the buffer 32 with the information to generate that portion of the E shown in scan line 1. It should be borne in mind that in the present invention the character is formed by dragging the electrodes A through H and M through T over the print medium rather than by pulsing the electrodes and therefore, the area of the charged image formed is $X \times (Y + Z)$ where Z is determined by the duration the styli are energized times the velocity the paper is travelling.

Therefore, in FIGS. 1*a* and 1*b*, row 14 styli, which are offset from row 12 styli, print when the energized portions of row 12 move up to row 14. Synchronization is therefore provided by the code disc 36 through the pick-up 38 directed to the drivers to insure that the row 12 and row 14 print areas are in proper locations to form the straight lines of, say the three horizontal portions, of the letter E.

The printing sequence begins by electrically energizing and dragging the selected styli for forming the first scan line of the desired matrix character. The row initially energized is row 12 in FIG. 1a, and electrodes A through F would be energized to form the letter E. Row 12 electrodes are kept on until the dragged styli charge pattern reaches row 14, and at this time selected styli in row 14, which would be electrodes M through R, are energized, rows A through F remaining energized and being dragged across the media simultaneously with the energization of the electrodes of row 14.

This sequence of dragging and energizing the two rows of styli simultaneously continues for subsequent scan lines of the desired character until a final scan line is reached. Thus, electrode M of row 14 and electrode A of row 12 would remain energized throughout the printing of the letter E, or during each of the scan lines 1 through 9 as depicted in FIG. 1b. Designating the scan lines as N, N + 1, N + 2, etc., it should here be noted that in the present invention it is not necessary to print scan lines N and N + 1 simultaneously. Scan lines N and N + 2 or N and N + 3, etc., may also be printed simultaneously wherever this is practical. This is in contrast to the device disclosed in the aforementioned U.S. Pat. No. 3,624,661 wherein it was required that scan line N and N + 2 be printed simultaneously.

In order to accomplish the preceding print operation, the structure shown in FIGS. 2a, 2b and 3 is employed. As shown in FIGS. 2a, the print medium M is driven by the rollers 18 and 20 over the surface 16 of the print head 10, between the print head and the rollers 22 and 24. Rotation of the roller 20 moves the indicia of the code disc 36 past the pick-up sending pulses to the drivers in the assembly 34 which are indicative of the actual paper movement over the head 10.

As previously alluded to, each scan line is stored in the buffer storage 32 which sends, 2,112 separate signals to the driver assembly, one to each driver, indicating whether printing is to occur at a particular point along the fixed scan line to be printed on the medium.

Referring to FIG. 3, a constant steady state voltage $V_2$, which is of the order of 600 volts in practice, is applied to the rollers 22 and 24, and a voltage in the area of 450 volts at $V_3$ is maintained on the electrodes of the head 10 during non-printing operations. This gives a difference in potential between the head 10 and rollers 22 and 24 of about 150 volts, which is not adequate for the electrostatic field to cause ionization or establishing a charged latent image on the dielectric medium surface.

When printing is to be accomplished at a particular electrode, for the next scan line a signal is transmitted over the line 40 from the pick-up 38 indicating that indicia on the code disc 36 is calling for the next line to be printed. The setting and resetting of the flip-flop 46 determines the print pulse duration, and duration of styli dragging effect. The setting and resetting of the flip-flop 46 is generated from the pulse on the line 40 emanating from the code disc, which generates the pulse each time the paper moves a predetermined increment. If data is to be printed for a particular stylus, the data select "and", emanating on the line 33, together with the pulse from the code disc on the line 40 sets the flip-flop and dragging of the charged image begins.

The flip-flop 46 remains set, and dragging continues, for an increment that the paper and code disc moves until the next pulse location on the disc 36 is reached. The signal emanating from the flip-flop 46 transfers through the diodes 48, 50 and 54 to the transistor 58 which serves to switch the voltage on the electrode from 450 volts to zero volts and a potential of 600 volts occur across the particular electrode generating an electrostatic charge on the medium M. At the time that the paper has moved a particular increment, which in practice is about 5 mils, and the disc 36 indicates that a decision must be made if data is again to be required for subsequent scan line of the character being formed. If such is the case, the signal remains on the line 33, a pulse is again received on the line 40, the flip-flop 46 remains in the set position and dragging of the charged pattern continues with the voltage across the media M remaining at 600 volts.

However, if data is not required for the next scan line, the signal is absent on the line 33 and when a pulse is received on the line 40, the flip-flop 46 is reset and dragging of the charged pattern, for that particular electrode, ceases due to the transistor 58 returning the particular electrode back to its 450 volts state. This operation, and the setting and resetting of the particular electrodes continues until a character is completed.

It is worth noting at this point in the description that since the code disc 36 is connected to the roller 20, and as a result moves directly as the print media M is moved. Thus, the distance on electrode is dragged while energized is dependent only on the distance the media M has traveled and is independent of the media velocity.

From the foregoing description, it should be realized that the present invention, which includes the dragging of the electrode across the media to provide electrostatic printing has many advantages over the prior art processes and devices. As the styli herein disclosed are quite thin, electrode capacitance is reduced, thereby reducing circuit loads for the styli circuit drivers. Additionally, since capacitance is also lower, less energy is stored between styli which significantly reduces the possibility of stylus destruction from capacitance discharge.

Another advantage of the present arrangement is that since the electrostatic field is greater around the periphery of the cross-section of the styli, ionization necessary for printing occurs at lower voltages around the periphery. By reducing the cross-sectional area, lower voltages and faster printing results, with the thin styli employed in the present invention.

Further advantages to the present invention can be found in the fact that the thin styli make manufacturing of the print heads much simpler, and in addition spacing between the offset rows of styli is not constrained, as dragging not determines the styli width. And finally, since printing is caused by dragging the styli, continuous printing is accomplished on vertical lines as P, L, H, etc. where continuous printing is desired.

While the present invention has been described in connection with a particular embodiment thereof, it is to be understood that modifications of this embodiment, as well as other embodiments utilizing the underlying principle of the invention are included within the spirit and scope of the invention which is to be limited only by the accompanying claims.

What is claimed is:

1. In an electrographic printing system of the type wherein a recording medium moving along a path has latent images formed thereon by selectively applying a high potential across the medium and wherein the latent image is subsequently made visible by applying a toner to the medium, an electrode structure adjacent the path including a plurality of spaced rows of electrodes, successive electrodes in each of said rows being spaced from each other, the electrodes of successive rows being staggered;

means for selectively energizing each of said electrodes; and means for continuously maintaining the energization of selected ones of said electrodes to form elongated latent images substantially longer than the length of the electrodes in the direction of movement of the medium.

2. The electrographic printing system of claim 1 wherein each of said electrodes is of a smaller dimension in the direction of movement of said medium than the dimension transverse to movement of said medium.

3. The electrographic printing system of claim 1 which includes a single steady state potential means disposed adjacent the opposite side of said path from said electrodes and extending substantially for an entire electrode row width for imparting a continuous potential across said medium over the width of an electrode row wherein the single steady state potential means is effective to provide a continuous potential to the medium for each successive row of said plurality of rows.

4. The electrographic printing system of claim 1 further including means for indicating that a predetermined length of medium has traveled along the path and sensing means connected to the electrode energizing means and responsive to an output from said indicating means to maintain or terminate the energization of each of said electrodes.

5. In an electrographic printing system of the type wherein a recording medium moving along a path has latent images formed thereon by selectively applying a high potential across the medium and wherein the latent image is subsequently made visible by applying a toner to the medium, an electrode structure adjacent the path including a plurality of spaced rows of electrodes, successive electrodes in each of said rows being spaced from each other, the electrodes of successive rows being staggered;

means for selectively energizing each of said electrodes;

means for continuously maintaining the energization of selected ones of said electrodes to form elongated latent images substantially longer than the length of the electrodes in the direction of movement of the medium; and a steady state potential means disposed adjacent the opposite side of the path from said electrodes and extending for an entire electrode row width for imparting a continuous potential across the medium over the width of an electrode row.

* * * * *